(12) United States Patent
Fukasawa et al.

(10) Patent No.: US 8,900,335 B2
(45) Date of Patent: Dec. 2, 2014

(54) CMP POLISHING SLURRY AND METHOD OF POLISHING SUBSTRATE

(75) Inventors: Masato Fukasawa, Hitachi (JP); Naoyuki Koyama, Hitachi (JP); Kouji Haga, Hitachi (JP); Toshiaki Akutsu, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 212 days.

(21) Appl. No.: 12/768,082

(22) Filed: Apr. 27, 2010

(65) Prior Publication Data

US 2010/0210109 A1 Aug. 19, 2010

Related U.S. Application Data

(62) Division of application No. 11/576,014, filed as application No. PCT/JP2005/017764 on Sep. 27, 2005, now abandoned.

(30) Foreign Application Priority Data

Sep. 28, 2004 (JP) .................................. 2004-281508

(51) Int. Cl.
*B24D 3/02* (2006.01)
*C09C 1/68* (2006.01)
*C09K 3/14* (2006.01)
*C09G 1/02* (2006.01)

(52) U.S. Cl.
CPC ................ *C09K 3/1463* (2013.01); *C09G 1/02* (2013.01)
USPC .......................................... 51/307; 438/692

(58) Field of Classification Search
USPC ........................................................ 252/79.1
See application file for complete search history.

(56) References Cited

U.S. PATENT DOCUMENTS

| | | | |
|---|---|---|---|
| 6,221,118 B1 * | 4/2001 | Yoshida et al. ................... 51/309 |
| 6,420,269 B2 * | 7/2002 | Matsuzawa et al. ............. 51/307 |
| 6,454,819 B1 * | 9/2002 | Yano et al. ........................ 51/298 |
| 6,783,434 B1 * | 8/2004 | Akahori et al. .................. 451/41 |
| 6,821,897 B2 * | 11/2004 | Schroeder et al. ..... 257/E21.304 |
| 6,863,700 B2 * | 3/2005 | Yoshida et al. ................... 51/309 |
| 7,410,409 B1 | 8/2008 | Koyama et al. |
| 2002/0016060 A1 * | 2/2002 | Matsuzawa et al. ........... 438/633 |
| 2002/0069593 A1 * | 6/2002 | Yoshida et al. ................... 51/309 |
| 2004/0147206 A1 * | 7/2004 | Akahori et al. .................. 451/41 |
| 2005/0064318 A1 * | 3/2005 | Shida et al. ..................... 430/126 |
| 2005/0085168 A1 * | 4/2005 | Yoshida et al. ................... 51/309 |
| 2005/0104048 A1 * | 5/2005 | Thomas et al. ................... 252/515 |
| 2005/0136671 A1 * | 6/2005 | Goldberg et al. ............. 438/691 |
| 2005/0189322 A1 * | 9/2005 | Lane et al. ..................... 252/79.1 |
| 2005/0208882 A1 * | 9/2005 | Cho et al. ........................ 451/41 |
| 2006/0021972 A1 * | 2/2006 | Lane et al. ..................... 252/79.1 |
| 2006/0111024 A1 * | 5/2006 | Wang ............................... 451/41 |
| 2006/0148667 A1 | 7/2006 | Fukasawa et al. |
| 2006/0283092 A1 * | 12/2006 | Chinone ......................... 51/307 |
| 2007/0169421 A1 | 7/2007 | Koyama et al. |
| 2008/0214093 A1 | 9/2008 | Fukasawa et al. |

FOREIGN PATENT DOCUMENTS

| | | | | |
|---|---|---|---|---|
| JP | 10-106994 A | 4/1998 | | |
| JP | 11-293231 A | 10/1999 | | |
| JP | 2000-313815 A | 11/2000 | | |
| JP | 2001-107089 A | 4/2001 | | |
| JP | 2001-358100 A | 12/2001 | | |
| JP | 3278532 B2 | 4/2002 | | |
| JP | 2003-347247 A | 12/2003 | | |
| JP | 2003-347248 A | 12/2003 | | |
| JP | 2004335689 A | * 11/2004 | ............. | B24B 37/00 |
| JP | 2005167016 A | * 6/2005 | ............. | B24B 37/00 |
| KR | 2002-0015697 A | 10/2002 | | |
| KR | 2005029605 A | * 3/2005 | ............... | C09K 3/14 |
| WO | 00/79577 A1 | 12/2000 | | |
| WO | 2004068570 A1 | 8/2004 | | |
| WO | WO 2004068570 A1 | * 8/2004 | ............... | B24B 1/00 |

OTHER PUBLICATIONS

Wako Specialty Chemicals, "V-50", http://www.wako-chem.co.jp/specialty/waterazo/V-50.htm.*
Japanese Office Action dated Jul. 14, 2009 (dispatch date), issued in corresponding Japanese Patent Application No. 2006-523471.
T. Honma et al, "Effect of various Factors on Grinding Using Jet Mill", Chemical Engineering Paper Collection, vol. 6, No. 5, 1980, pp. 527-532. English Abstract.
International Search Report of PCT/JP2005/017764, mailing date of Nov. 8, 2005.
Korean Office Action dated Feb. 29, 2008, issued in corresponding Korean Patent Application No. 10-2007-7005762.
Taiwanese Office Action dated May 22, 2008, issued in corresponding Taiwanese Patent Application No. 09720260260.
English Translation of Chemical Handbook (Basic) Revised Ed., 4th, Sep. 30, 1993, pp. II-317-II-322, Chemical Society of Japan Ed, Maruzen Co., Ltd.
Japanese Office Action dated Dec. 15, 2009, issued in corresponding Patent Application 2006-523471.
Japanese Office Action dated Jan. 5, 2010 (mailing date), issued in corresponding Japanese Patent Application No. 2006-523471.
Japanese Office Action dated Feb. 22, 2011, issued in corresponding Japanese Patent Application No. 2006-523471.
Chinese Office Action dated Apr. 13, 2010, issued in corresponding Chinese Patent Application No. 2008101461550.

* cited by examiner

*Primary Examiner* — Kaj K Olsen
*Assistant Examiner* — Ross J Christie
(74) *Attorney, Agent, or Firm* — Westerman, Hattori, Daniels & Adrian, LLP

(57) ABSTRACT

A CMP polishing slurry of the present invention contains cerium oxide particles, water, and a polymer of at least one of a methacrylic acid and the salt thereof, and/or a polymer of at least one of a methacrylic acid and the salt thereof and a monomer having an unsaturated double bond, preferably contains furthermore a dispersant or a polymer of monomers containing at least one of an acrylic acid and the salt thereof. The present invention provides a CMP polishing slurry and a polishing method that, after polishing, give a polished film having a smaller difference in residual film thickness due to a pattern density difference.

8 Claims, No Drawings

CMP POLISHING SLURRY AND METHOD OF POLISHING SUBSTRATE

This application is the division of the U.S. application Ser. No. 11/576,014 filed Mar. 26, 2007, which is herein incorporated by reference.

TECHNICAL FIELD

The present invention relates to a CMP polishing slurry and a method of polishing a substrate that are favorably used in a step of smoothening the surface of a substrate in production of semiconductor devices, in particular in steps of smoothening an interlayer dielecrtric film and a BPSG (silicon dioxide film doped with boron and phosphorus) film and forming a shallow trench isolation film, and others.

BACKGROUND ART

Currently under research and development are processing methods for improvement in density and miniaturization in production of ULSI semiconductor devices. One of the methods, chemical mechanical polishing (CMP) technology, is now a technology essential in production of semiconductor devices, for example, for smoothening of an interlayer dielecrtric film, forming a shallow trench device isolation, and forming plugged and embedded metal wiring.

In production of semiconductor devices, inorganic insulation film layers such as a silicon oxide insulation film are formed by methods such as plasma CVD and low-pressure CVD. Polishing slurries of fumed silica are commonly studied as a conventional chemical mechanical abrasive in state of slurry for use in smoothening the inorganic insulation film layer. The fumed silica polishing slurries are produced by grain growth, for example, by oxidative thermolysis of tetrachlorosilane and subsequent pH adjustment. However, such a fumed silica polishing slurry still has a problem that the polishing speed is lower.

A shallow trench isolation method has been used for isolation of elements in an integrated circuit in devices in the generation of a design rule of 0.25 µm or later. In the shallow trench isolation method, CMP is used for removal of excessive silicon oxide films formed on a substrate, and a stopper film smaller in polishing speed is formed under the silicon oxide film for termination of polishing. For example, silicon nitride is used for the stopper film, and the difference in polishing speed between the silicon oxide film and the stopper film is preferably greater. However, colloidal silica-based polishing slurries have a smaller polishing speed ratio between the silicon oxide film and the stopper film at approximately 3, and thus, do not have properties practically usable for shallow trench isolation.

On the other hand, cerium oxide polishing slurries have been used as abrasives for use on the surface of glasses such as of photomask and lens. Cerium oxide particles are softer than silica or alumina particles, less likely to cause scratching on the polishing surface, and thus, useful for finishing mirror-surface polishing. The particles also have an advantage that the polishing speed therewith is faster than that of silica polishing slurries. Recently, CMP polishing slurries for semiconductor processing containing a high-purity cerium oxide polishing powder have been used. (See Japanese Patent Application Laid-Open No. 10-106994.

A water-soluble polymer having a hydrophilic carboxyl or carboxyl salt group is known to be added as an additive to the cerium oxide CMP polishing slurry for control of the polishing speed of a cerium oxide CMP polishing slurry and improvement of global smoothness (see, for example, Japanese Patent No. 3,278,532).

Examples of monomers for the additive include an acrylic acid, an itaconic acid, a maleic acid, and the salts, and the most polymerizable acrylic acid is seemingly most preferable. However, cerium oxide CMP polishing slurries containing an additive of water-soluble polymer as the monomer could not reduce the difference in residual film thickness due to the pattern density difference of the film to be polished sufficiently.

There are fewer studies on methacrylic acid polymers, because a methacrylic acid is more hydrophobic and only soluble in water at a concentration of 18% at room temperature and hardly gives a high-molecular weight polymer by polymerization. Accordingly, it is not regarded as a monomer suitable for the polymer for use as the additive.

DISCLOSURE OF THE INVENTION

The present invention provides a CMP polishing slurry and a polishing method that, after polishing, give a polished film having a smaller difference in residual film thickness due to a pattern density difference.

The present invention relates to the following inventions (1) to (13).

(1) A CMP polishing slurry, containing (A) cerium oxide particles, (B) a dispersant, (C) water, and (D) at least one of a polymer of at least one of a methacrylic acid and the salt thereof, and a polymer of at least one of a methacrylic acid and the salt thereof and a monomer having an unsaturated double bond.

(2) A CMP polishing slurry, containing (A) cerium oxide particles, (C) water, and (D) at least one of a polymer of at least one of a methacrylic acid and the salt thereof, and a polymer of at least one of a methacrylic acid and the salt thereof and a monomer having an unsaturated double bond.

(3) A CMP polishing slurry, containing (A) cerium oxide particles, (C) water, (D) at least one of a polymer of at least one of a methacrylic acid and the salt thereof, and a polymer of at least one of a methacrylic acid and the salt thereof and a monomer having an unsaturated double bond, and (E) at least one of a polymer of at least one of an acrylic acid and the salts thereof, and a polymer of at least one of an acrylic acid and the salt thereof and a monomer having an unsaturated double bond.

(4) The CMP polishing slurry according to any one of (1) to (3), wherein the content of the methacrylic acid and the salt thereof for the polymer (D) is 10 to 100 mol % with respect to the total amount of the monomer components.

(5) The CMP polishing slurry according to any one of (1) to (4), wherein a polymerization initiator for use in preparation of the polymer is a compound soluble completely at 25° C. when it is added at a ratio of 0.5 part in 99.5 mass parts of water or a compound soluble at 25° C. when it is added at a ratio of 0.5 mass part in 99.5 mass parts of water and at least one of an organic acid and an inorganic acid is added thereto in an amount of 2 moles with respect to 1 mole of the polymerization initiator.

(6) The CMP polishing slurry according to any one of (1) to (5), wherein a polymerization initiator for use in preparation of the polymer is a compound soluble completely at 25° C. when it is added at a ratio of 3.0 parts in 97.0 mass parts of water or a compound soluble at 25° C. when it is added at a ratio of 3.0 mass parts in 97.0 mass parts of water and at least one of an organic acid and an inorganic acid is added thereto in an amount of 2 moles with respect to 1 mole of the polymerization initiator.

(7) The CMP polishing slurry according to any one of (1) to (6), wherein the amount of the polymer added is 0.01 to 5 mass parts with respect to 100 mass parts of the CMP polishing slurry.

(8) The CMP polishing slurry according to any one of (1) to (7), wherein the weight-average molecular weight of the polymer is 200 to 100,000.

(9) The CMP polishing slurry according to any one of (1) to (8), wherein the average particle diameter of the cerium oxide particles is 1 to 400 nm.

(10) The CMP polishing slurry according to any one of (1) to (9), wherein the amount of the cerium oxide particles added is 0.1 to 5 mass parts with respect to 100 mass parts of the CMP polishing slurry.

(11) The CMP polishing slurry according to any one of (1) to (10), wherein the pH of the polishing slurry is 4.5 to 6.0.

(12) The CMP polishing slurry according to any one of (1) to (11), further containing a strong acid ion, wherein the content of the strong acid ion is 50 to 10,000 ppm by mass with respect to the CMP polishing slurry.

(13) A method of polishing a substrate, characterized by pressing a substrate having a formed film to be polished onto a polishing cloth of a polishing table, and polishing the film to be polished by moving the substrate and the polishing table relatively to each other while supplying the CMP polishing slurry according to any one of (1) to (12) into the space between the film to be polished and the polishing cloth.

The CMP polishing slurry and the polishing method according to the present invention give a film to be polished smaller in the difference in residual film thickness due to a pattern density difference.

This application claims priority from Japanese Patent Application No. 2004-281508 filed on Sep. 28, 2004, the entire content of which is incorporated herein by reference.

BEST MODE OF CARRYING OUT THE INVENTION

A CMP polishing slurry according to the present invention is produced, for example, by preparing a cerium oxide slurry containing cerium oxide particles, a dispersant and water, and a supplementary solution containing an additive and water, followed by mixing these liquids.

The cerium oxide particles (A) according to the present invention are prepared, for example, by oxidizing a cerium compound such as a carbonate salt, a nitrate salt, a sulfate salt or oxalate salt. A cerium oxide polishing slurry for use in polishing a silicon oxide film formed, for example, by a TEOS-CVD method allows high-speed polishing, but leaves more polishing scratches on the polished film, when the crystallite diameter of the particle becomes greater and the crystal distortion becomes smaller, i.e., when the crystallinity thereof is higher. Although the method of producing the cerium oxide particles for use in the present invention is not particularly limited, the crystallite diameter of the cerium oxide is preferably 1 nm or more and 400 nm or less. When the particle is used for polishing during production of semiconductor devices, the content of alkali metals and halogens in the cerium oxide particle is preferably kept, for example, to 10 ppm or less by mass.

In the present invention, the cerium oxide particles can be prepared, for example, by calcining or by oxidation with hydrogen peroxide or the like. The calcining temperature is preferably in the range of 350° C. to 900° C.

The cerium oxide particles prepared by the method are preferably pulverized mechanically, if aggregated. The pulverization method is preferably a dry pulverization method, for example, by using a jet mill, or a wet pulverization method, for example, by using a planetary bead mill. The jet mill is described, for example, in Kagaku Kogaku Ronbunshu (Chemical Engineering Paper Collection), Vol. 6, No. 5 (1980) pp. 527 to 532.

Such cerium oxide particles can be dispersed in water which is a primary dispersion medium, by dispersing the mixture in a homogenizer, an ultrasonic dispersing machine, a wet ball mill, or the like as well as a common stirrer.

Further fine cerium oxide dispersion is prepared, for example, by a sedimentation classification method of leaving a cerium oxide dispersion for a long period to allow sedimentation of larger particles and withdrawing a supernatant liquid by a pump. Alternatively, the cerium oxide particles in the dispersion medium may be pulverized further in a high-pressure homogenizer that pulverizes particles by collision under high pressure.

The average particle diameter of the cerium oxide particles in the CMP polishing slurry thus prepared is preferably 1 to 400 nm, more preferably 1 to 300 nm, and still more preferably 1 to 200 nm. An average cerium oxide particle diameter of less than 1 nm may lead to decrease in polishing speed, while an average cerium oxide particle diameter of more than 400 nm may lead to more frequent scratching on the polished film.

In the present invention, the average particle diameter of cerium oxide particles is a D50 value (median diameter of volumetric distribution, cumulative median value), as determined in a laser-diffraction particle size distribution analyzer.

The concentration of the cerium oxide particles is preferably in the range of 0.1 mass part or more and 5 mass parts or less, more preferably in the range of 0.2 mass part or more and 2 mass parts or less, and still more preferably in the range of 0.5 mass part or more and 1.5 mass parts or less, with respect to 100 mass parts of the CMP polishing slurry. A concentration of less than 0.1 mass part leads to deterioration in polishing speed, while a concentration of more than 5 mass parts leads to easier aggregation of cerium oxide particles.

The CMP polishing slurry according to the present invention preferably contains a dispersant (B). Examples of the dispersants according to the present invention include water-soluble anionic dispersants, water-soluble nonionic dispersants, water-soluble cationic dispersants, and water-soluble amphoteric dispersants; polycarboxylic acid-based polymer dispersants described below are preferable; and polymer dispersants containing, as a copolymer component, an ammonium acrylate salt as its structural unit are more preferable.

Examples of the polymer dispersants containing, as a copolymer component, an ammonium acrylate salt as its structural unit include ammonium polyacrylate, copolymers of acrylic amide and ammonium acrylate, and the like. Alternatively, a mixture of two or more dispersants, for example a mixture of at least one polymer dispersant containing, as a copolymer component, an ammonium acrylate salt as its structural unit and at least one other dispersant, for example, selected from water-soluble anionic, nonionic, cationic and amphoteric dispersants, may be used.

When the polishing slurry is used for polishing in production of semiconductor devices, the total content of alkali metals such as sodium and potassium ions, and halogen and sulfur atoms in the dispersant is preferably kept, for example, to 10 ppm or less by mass with respect to the CMP polishing slurry.

Examples of the water-soluble anionic dispersants include triethanolamine laurylsulfate, ammonium laurylsulfate, triethanolamine polyoxyethylene alkylether sulfates, and polycarboxylic acid-based polymer dispersants.

Examples of the polycarboxylic acid-based polymer dispersants include polymers from a carboxylic acid monomer having an unsaturated double bond such as acrylic acid, methacrylic acid, maleic acid, fumaric acid, or itaconic acid; copolymers from a carboxylic acid monomer having an unsaturated double bond and another monomer having an unsaturated double bond; and the ammonium or amine salts thereof.

Examples of the water-soluble nonionic dispersants include polyoxyethylene laurylether, polyoxyethylene cetylether, polyoxyethylene stearylether, polyoxyethylene oleylether, polyoxyethylene higher alcohol ethers, polyoxyethylene octylphenylether, polyoxyethylene nonylphenylether, polyoxyalkylene alkylether, polyoxyethylene derivatives, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethyltetraoleate ethylene sorbitol, polyethylene glycol monolaurate, polyethylene glycol monostearate, polyethylene glycol distearate, polyethylene glycol monooleate, polyoxyethylene alkylamine, polyoxyethylene hydrogenated castor oil, 2-hydroxyethyl methacrylate, and alkyl alkanol amides.

Examples of the water-soluble cationic dispersants include polyvinylpyrrolidone, coconut amine acetate, and stearylamine acetate.

Examples of the water-soluble amphoteric dispersants include laurylbetaine, stearylbetaine, lauryldimethylamine oxide, and 2-alkyl-N-carboxymethyl-N-hydroxyethylimidazolinium betaine.

The dispersants (B) are used alone or in combination of two or more.

The dispersant is effective in dispersing the cerium oxide particles stably in a dispersion medium (C) such as water.

The amount of the dispersant added is preferably 0.01 mass part or more and 10 mass parts or less, more preferably 0.05 mass part or more and 8 mass parts or less, and particularly preferably 0.1 mass part or more and 5 mass parts or less, with respect to 100 mass parts of the cerium oxide particles, from the viewpoints of improvement of dispersion and for prevention of sedimentation of the particles in the polishing slurry and polishing scratch. An addition amount of less than 0.01 mass part leads to insufficient dispersion of the particles and thus generation of more polishing scratches on the polished film, while an addition amount of more than 10 mass parts leads to aggregation and sedimentation of the particles and generation of more polishing scratches on the polished film.

The weight-average molecular weight of the dispersant is preferably 100 to 50,000, more preferably 1,000 to 10,000, from the viewpoints of polishing speed and storage stability. A weight-average molecular weight of less than 100 leads to insufficient polishing speed, while that of more than 50,000 leads to increase in viscosity and deterioration in the storage stability of the polishing slurry. The weight-average molecular weight is a value as polyethylene glycol, as determined with a HPLC pump (Model No. L-7100, manufactured by Hitachi, Ltd.) equipped with a differential refractometer (Model No. L-3300, manufactured by Hitachi, Ltd.) and a GPC column (Model No. Gelpack GL-W550, manufactured by Hitachi Chemical Co., Ltd.) connected thereto by using a liquid mixture of aqueous 50 mM disodium hydrogen phosphate solution/acetonitrile: 90/10 (V/V) as a mobile phase.

The CMP polishing slurry according to the present invention contains a polymer of at least one of a methacrylic acid and the salt thereof and/or a polymer of at least one of a methacrylic acid and the salt thereof and a monomer having an unsaturated double bond (D). Presence of the polymer (D) improves smoothening characteristics. It also reduces the polishing speed of the stopper film (silicon nitride film) more effectively than that of the film to be polished mainly (silicon oxide film), making process management of polishing easier.

The content of the methacrylic acid and the salt thereof for the polymer (D) is preferably 10 to 100 mol %, more preferably 30 to 100 mol %, still more preferably 50 to 100 mol %, particularly preferably 60 to 100 mol %, very preferably 70 to 100 mol %, extremely preferably 80 to 100 mol %, and most preferably 90 to 100 mol %, with respect to the total amount of the monomer components, from the viewpoint of global smoothening characteristics. A content of the methacrylic acid and the salt thereof at less than 10 mol % leads to increase of the difference in residual film thickness of the polished film due to the pattern density difference.

An ammonium, potassium, alkylamine or other salt of a methacrylic acid may be used alone or in combination with a methacrylic acid as the monomer for the polymer (D). The polymer (D) may be a polymer containing at least one of a methacrylic acid and the salt thereof as part of the monomers, a polymer containing only at least one of a methacrylic acid and the salt as the monomer, or a combination of these polymers.

The polymer may also function as a dispersant occasionally.

Examples of the monomers having an unsaturated double bond include carboxylic acids such as acrylic acid, crotonic acid, vinylacetic acid, tiglic acid, 2-trifluoromethylacrylic acid, itaconic acid, fumaric acid, maleic acid, citraconic acid, mesaconic acid, and gluconic acid; and sulfonic acids such as 2-acrylamido-2-methylpropanesulfonic acid. Alternatively, a salt thereof such as ammonium, potassium, or alkylamine salt may be used.

Other examples of the monomers having an unsaturated double bond for use include radical polymerizable monomers such as $C_1$- to $C_{18}$-acrylic esters, $C_1$- to $C_{18}$-methacrylic esters, acrylamide, N,N-dimethylacrylamide, N,N-diethylacrylamide, N-iso-propylacrylamide, acryloylmorpholine, vinylalcohol, acrylonitrile, vinylpyrrolidone, and vinylpyridine.

These monomers may be used alone or in combination of two or more.

The polymer (D) may be used in combination with (E) a polymer of at least one of an acrylic acid and the salt thereof and/or a polymer of at least one of an acrylic acid and the salt thereof and a monomer having an unsaturated double bond. The polymer (E) is favorable as it controls the solubility in water.

A polymerization initiator polymerizing these monomers and giving a polymer is preferably, for example, a water-soluble compound. As for the water solubility of the polymerization initiator, the initiator preferably have a solubility to the degree that the initiator is completely soluble when it is added in an amount of 0.5 mass part in 99.5 mass parts of water and stirred in water at 25° C., or that the initiator is soluble completely when it is added in an amount of 0.5 mass part in 99.5 mass parts of water and an organic acid and/or an inorganic acid are added thereto in an amount of 2 moles with respect to 1 mole of the polymerization initiator. The complete solubilization can be determined, for example, by placing and sealing 0.15 g of a polymerization initiator and 29.85 g of purified water in a capped polypropylene centrifugal tube having a capacity of 50 ml at 25° C., rotating the tube in a test tube mixer at 2,500 rpm for 3 minutes, and examining the presence of an insoluble matter by visual observation.

The polymerization initiator more preferably has a solubility to the degree that the initiator is completely soluble when it is added in an amount of 3.0 mass parts in 97.0 mass parts of water or when it is added in an amount of 3.0 mass parts in 97.0 mass parts of water and an organic acid and/or an inorganic acid are added thereto in an amount of 2 moles with respect to 1 mole of the polymerization initiator. The complete solubilization can be determined, for example, by placing and sealing 0.9 g of a polymerization initiator and 29.1 g of purified water in a capped polypropylene centrifugal tube having a capacity of 50 ml at 25° C., rotating the tube in a test tube mixer at 2,500 rpm for 3 minutes, and examining the presence of an insoluble matter by visual observation.

Examples of the polymerization initiators include the followings: peroxides such as ammonium persulfate, potassium persulfate, and sodium persulfate; redox initiators in combination of a sulfite salt such as ammonium sulfite, ammonium hydrogen sulfite, potassium sulfite, potassium hydrogen sulfite, sodium sulfite or sodium hydrogen sulfite, and oxygen, air, peroxide, or the like; amphoteric azo compounds such as 2,2'-azobis[N-(2-carboxyethyl)-2-methyl propionamide]; and cationic azo compounds such as 1-[(1-cyano-1-methylethyl)azo]formamide, 2,2'-azobis {2-methyl-N-[1,1-bis(hydroxymethyl)-2-hydroxyethyl]propionamide}, 2,2'-azobis {2-methyl-N-[2-(1-hydroxybutyl)]-propionamide}, 2,2'-azobis[2-methyl-N-(1-hydroxyethyl)]-propionamide, 2,2'-azobis[2-(5-methyl-2-imidazolin-2-yl)propane]hydrochloride salt, 2,2'-azobis[2-(2-imidazolin-2-yl)propane], 2,2'-azobis[2-(2-imidazolin-2-yl)propane]hydrochloride salt, 2,2'-azobis[2-(2-imidazolin-2-yl)propane]sulfate hydrate salt, 2,2'-azobis[2-(3,4,5,6-tetrahydropyrimidin-2-yl)propane]hydrochloride salt, 2,2'-azobis {2-[1-(2-hydroxyethyl)-2-imidazolin-2-yl]propane}hydrochloride salt, 2,2'-azobis(2-amidinopropane) hydrochloride salt, 2,2'-azobis[N-(2-carboxyethyl)-2-methylpropionamidine], and 2,2'-azobis (2-methylpropionamidoxime). A salt of an organic acid such as acetic acid, oxalic acid, malonic acid, succinic acid, malic acid, tartaric acid, or citric acid; or a salt of an inorganic acid such as phosphoric acid, hydrobromic acid, hydroiodic acid, hydrofluoric acid, nitric acid, or sulfuric acid may be added, for improvement of the water solubility of the polymerization initiator described above. The organic acid and/or the inorganic acid are preferably added in an amount of 2 moles with respect to 1 mole of the polymerization initiator. 2,2'-azobis{2-methyl-N-[1,1-bis(hydroxymethyl)-2-hydroxyethyl]propionamide}, 2,2'-azobis[2-methyl-N-(1-hydroxyethyl)]-propionamide and 2,2'-azobis[2-(2-imidazolin-2-yl) propane] are preferably used, as it is mixed with the organic acid and/or the inorganic acid above.

An anionic azo compound such as 4,4'-azobis(4-cyanovaleric acid) may be used, for example, as a polymerization initiator other than the water-soluble compounds above.

These compounds are used alone or in combination of two or more.

A solvent for use during polymerization is not particularly limited, but favorable examples thereof include water, and $C_1$ to $C_4$ alcohols such as methanol, isopropanol, propanol and butanol. These solvents are used alone or in combination of two or more.

The weight-average molecular weight of the polymer thus obtained is preferably 200 to 100,000, more preferably 300 to 70,000, and particularly preferably 500 to 50,000 (as polyethylene glycol). A polymer having a weight-average molecular weight of less than 200 may lead to insufficient global smoothening characteristics, while a polymer having a molecular weight of more than 100,000 may lead to in sufficient polishing speed. The weight-average molecular weight is a value as polyethylene glycol, as determined with a HPLC pump (Model No. L-7100, manufactured by Hitachi, Ltd.) equipped with a differential refractometer (Model No. L-3300, manufactured by Hitachi, Ltd.) and a GPC column (Model No. Gelpack GL-W550, manufactured by Hitachi Chemical Co., Ltd.) connected thereto by using a liquid mixture of aqueous 50 mM disodium hydrogen phosphate solution/acetonitrile: 90/10 (V/V) as a mobile phase. A mercapto compound-based molecular-weight-regulating agent such as mercaptoethanol may be used for control of the weight-average molecular weight during polymerization.

The amount of the polymer used in the present invention (total amount of the polymers (D) and (E) when the polymer (E) is also used) is preferably 0.01 to 5 mass parts, more preferably 0.05 to 3 mass parts, and particularly preferably 0.10 to 1 mass part with respect to 100 mass parts of the CMP polishing slurry. An addition amount of less than 0.01 mass part may prohibit high global smoothening characteristics, while an addition amount of more than 5 mass parts may lead to aggregation of the cerium oxide particles.

For global smoothening of an irregular-surfaced film to be polished such as a silicon oxide film, convex regions thereon should be polished selectively. When the polishing slurry containing the polymer is used, a protection film made of the polymer is formed on the surface of the cerium oxide particles and the film to be polished. Thus, the film to be polished in concave regions having a smaller effective polishing load is protected by the protection film, but the protection film on the film to be polished on the convex regions having a greater effective polishing load is selectively eliminated by polishing. However, water-soluble polymers commonly used as an additive such as a polyacrylic acid are higher in water solubility and seemingly form a thick protection film coarsely spotted on the film to be polished. For this reason, such a film is not polished sufficiently selectively, causing a problem of the increase of the difference in residual film thickness of the polished film due to the pattern density difference. On the other hand, the polymer (D) seems to form a thin dense adsorption layer on the film to be polished, because it contains a methacrylic acid, which is more hydrophobic than an acrylic acid, i.e., a monomer traditionally used for the polyacrylic acid, as its monomer. As a result, it forms a strong protection film on the surface of the film to be polished, allowing global smoothening with little pattern density dependency. In addition, the polymer according to the present invention seems to function also as a dispersant.

The supplementary solution used in the present invention may contain another water-soluble polymer with the polymer described above. The another water-soluble polymer is not particularly limited, and examples thereof include polysaccharides such as alginic acid, pectin acid, carboxymethylcellulose, agar, curdlan and pullulan; polycarboxylic acids and the salts such as polyaspartic acid, polyglutamic acid, polylysine, polymalic acid, polyamic acid, ammonium polyamate salt, sodium polyamate salt and polyglyoxylic acid, and the salts thereof; and vinyl polymers such as polyvinylalcohol, polyvinylpyrrolidone, and polyacrolein.

The CMP polishing slurry according to the present invention may be stored as a two-liquid CMP polishing slurry, for example, consisting of a cerium oxide slurry and a supplementary solution, or as a single-liquid CMP polishing slurry which is a mixture of a cerium oxide slurry and a supplementary solution. When the polishing slurry is stored as the two-liquid polishing slurry consisting of a cerium oxide slurry and a supplementary solution, it is possible to adjust the global smoothening efficiency and the polishing speed easily by changing the blending ratio of these two liquids. The supplementary solution and the cerium oxide slurry are fed to a polishing table as they are supplied separately from different pipes and mixed immediately before an supply pipe outlet where these pipes are connected, or the supplementary solution is mixed with the cerium oxide slurry immediately before polishing. It is also possible to adjust the polishing characteristics by adding deionized water as needed to the cerium oxide slurry and the additive immediately before mixing or during mixing in piping as described above.

The CMP polishing slurry according to the present invention is preferably used for polishing, after it is adjusted to a desirable pH. A pH adjuster for use is not particularly limited, but ammonia water or an acid component is used more favorably than an alkali metal when the polishing slurry is used for semiconductor polishing. The ammonium salt prepared by partial neutralization of the polymer or water-soluble polymer described above with ammonia may be used as the pH adjuster. The pH of the CMP polishing slurry is preferably 4.5 to 6.0, more preferably 4.8 to 5.6. A pH of less than 4.5 leads to deterioration in polishing speed, while a pH of more than 6.0 leads to deterioration in smoothness of the polished film.

The pH of the CMP polishing slurry according to the present invention can be determined by using a pH meter (for example, Model PH81, manufactured by Yokogawa Electric Corporation), and after two-point calibration with a standard buffer solution (a phthalate pH buffer solution, pH: 4.21 (25° C.) and a neutral phosphate pH buffer solution, pH 6.86 (25° C.)), an electrode is immersed in the CMP polishing slurry, and the pH stabilized after 2 minutes or longer is determined.

The CMP polishing slurry according to the present invention is resistant to the increase of the difference in residual film thickness of the polished film due to the pattern density difference, when it contains a strong acid ion additionally. In the present invention, the strong acid is an acid having a pKa of the first dissociable acidic group ($pK_{a1}$) at 3.2 or less. The value above in parenthesis is the pKa value described in the literature: "Chemical Handbook (Basic)" Revised Ed., 4th, (Chemical Society of Japan Ed., Sep. 30, 2003, Maruzen Co., Ltd.) pp. II-317 to 322.

Sulfuric acid ($pK_{a1}$: <0, $pK_{a2}$: 1.96, hereinafter, only $pK_{a1}$ is shown), hydrochloric acid (−3.7), nitric acid (−1.8), phosphoric acid (2.15), oxalic acid (1.04), maleic acid (1.75), picric acid (0.33), sulfurous acid (1.86), thiosulfuric acid (0.6), amidosulfuric acid (0.99), chloric acid, perchloric acid (<0), chlorous acid (2.31), hydroiodic acid (−10), periodic acid, iodic acid (0.77), hydrobromic acid (−9), perbromic acid, bromic acid, chromic acid (−0.2), nitrous acid (3.15), diphosphoric acid (0.8), tripolyphosphoric acid (2.0), picric acid (0.33), picolinic acid (1.03), phosphinic acid (1.23), phosphoric acid (1.5), isonicotinic acid (1.79), nicotinic acid (2.05), trichloroacetic acid (0.66), dichloroacetic acid (1.30), chloroacetic acid (2.68), cyanoacetic acid (2.47), oxaloacetic acid (2.27), nitroacetic acid (1.46), bromoacetic acid (2.72), fluoroacetic acid (2.59), phenoxyacetic acid (2.99), o-bromobenzoic acid (2.85), o-nitrobenzoic acid (2.17), o-chlorobenzoic acid (2.92), p-aminobenzoic acid (2.41), anthranilic acid (2.00), phthalic acid (2.75), fumaric acid (2.85), malonic acid (2.65), d-tartaric acid (2.83), citric acid (2.90), o-chloroaniline (2.64), 2,2'-bipyridine (2.69), 4,4'-bipyridine (2.69), 2,6-pyridinedicarboxylic acid (2.09), pyruvic acid (2.26), polystyrenesulfonic acid (<3.0), polysulfonic acid (<3.0), glutamic acid (2.18), salicylic acid (2.81), aspartic acid (1.93), 2-aminoethylphosphonic acid (1.1), glycine (2.36), arginine (2.05), isoleucine (2.21), sarcosine (2.15), ornithine (1.9), guanosine (1.8), citrulline (2.43), tyrosine (2.17), valine (2.26), hypoxanthine (2.04), methionine (2.15), lysine (2.04), and leucine (2.35). These are used alone or in combination of two or more.

The strong acid is more effective when the pKa of its first dissociable acidic group is lower, and thus, the pKa of the first dissociable acidic group is preferably 2.0 or less, more preferably 1.5 or less. A pKa of the first dissociable acidic group at more than 3.2 may result in insufficient effect. The method of adding a strong acid for use in the present invention is not particularly limited, and the strong acid may be added, for example, separately from the polymer and the water-soluble polymer, or may be contained previously in the polymerization initiator. Alternatively, the strong acid may be added to the polishing slurry in the form of a salt.

The strong acid ion added seems to prevent dissociation of the carboxyl groups in the polymer and other water-soluble polymers by preferential dissociation thereof over the polymer and other water-soluble polymers, and the polymer and the other water-soluble polymers prohibited from dissociation are adsorbed on the surface of the film to be polished, easily forming a protection film. As a result, it is possible to reduce the difference in residual film thickness of the film to be polished on a wafer having a pattern density difference further.

The content of the strong acid ion in the CMP polishing slurry is preferably 50 to 10,000 ppm, more preferably 100 to 1,000 ppm, and particularly preferably 200 to 600 ppm by mass. A content of less than 50 ppm leads to deterioration in reduction of the pattern density dependency, while a content of more than 10,000 ppm leads to deterioration in the dispersion stability of cerium oxide particles.

Water (C) is the main dispersion medium and is not particularly limited, but deionized water is preferable.

The polishing method according to the present invention is characterized by pressing a substrate having a film to be polished onto a polishing cloth of a polishing table, and polishing the film to be polished by moving the substrate and the polishing table relatively to each other while the CMP polishing slurry according to the present invention is supplied to the space between the film to be polished and the polishing cloth.

Examples of the substrates include substrates for semiconductor device production, for example, substrates having an inorganic insulation layer formed on a semiconductor substrate such as a semiconductor substrate having a circuit device and a wiring pattern formed thereon and a semiconductor substrate having a circuit device formed thereon. Examples of the films to be polished include the inorganic insulation layers described above including a silicon oxide film layer, a silicon nitride layer and the like. Surface irregularity is eliminated by polishing the silicon oxide or nitride film layer formed on the substrate with the CMP polishing slurry above, and the semiconductor substrate is smoothened over the entire surface.

In addition, the polishing method according to the present invention can also be used for shallow trench isolation. For use in shallow trench isolation, the ratio of the silicon-oxide-film polishing speed to the silicon-nitride-film polishing speed, i.e., (silicon-oxide-film polishing speed)/(silicon nitride film polishing speed), is preferably 10 or more. A ratio of 10 or more leads to greater drop of polishing speed after exposure of the silicon nitride film and thus, to easier termination of polishing. A ratio of less than 10 leads to difficulty in termination polishing at a predetermined position. For use in shallow trench isolation, the substrate is preferably protected from scratching during polishing.

Hereinafter, the polishing method will be described, taking a semiconductor substrate carrying an inorganic insulation layer such as a silicon oxide film formed thereon as an example.

For example, in the polishing method according to the present invention, a common polishing machine having: a polishing table with a removable polishing cloth (pad) connected, for example, to a rotational frequency-variable motor; and a holder capable of holding a substrate carrying a film to be polished such as a semiconductor substrate may be used as the polishing machine. Examples of the polishing machines include a polishing machine, Model No. EPO-111 manufactured by Ebara Corporation, and the like. The polishing cloth is not particularly limited, and examples thereof include general nonwoven fabrics, foamed polyurethane, porous fluoroplastics, and the like. The polishing cloth preferably has trenches for holding the CMP polishing slurry processed thereon. The polishing condition is not particularly limited, but the rotational velocity of the polishing table is preferably lower at 200 rpm or lower for prevention of separation of the semiconductor substrate, and the pressure applied onto the semiconductor substrate (processing load) is preferably 100 kPa or less for prevention of scratching after polishing. It is preferable to supply the CMP polishing slurry continuously, for example, by a pump to the polishing cloth during polishing. The feed rate is not particularly limited, but the surface of the polishing cloth is preferably, always covered with the CMP polishing slurry.

The semiconductor substrate after polishing is preferably washed thoroughly with running water and dried, as the water droplets on the semiconductor substrate are removed, for example, by a spin dryer. It is thus possible to eliminate surface irregularity and form a smooth surface over the entire area of the semiconductor substrate by polishing the inorganic insulation film, which is the film to be polished, with the polishing slurry. After the surface-smoothened shallow trenches are formed, aluminum wiring is formed on the inorganic insulation film layer; and then, an inorganic insulation film is formed between and on the wirings by a method described below and polished similarly with the CMP polishing slurry above, to give a smoothened surface. It is possible to produce a semiconductor substrate having a desired number of layers by repeating the steps above several times.

The inorganic insulation film such as a silicon oxide film, to which the CMP polishing slurry according to the present invention is used, is produced, for example, by low-pressure CVD, plasma CVD, or the like.

In preparing the silicon oxide film by the low-pressure CVD, monosilane $SiH_4$ is used as a Si source and oxygen $O_2$ is used as an oxygen source. The silicon oxide film is obtained in the $SiH_4$—$O_2$ oxidation reaction at a temperature of 400° C. or lower. The silicon oxide film is heat-treated as needed after CVD at a temperature of 1,000° C. or lower. When phosphorus P is doped for surface smoothening by high temperature reflow, use of a $SiH_4$—$O_2$—$PH_3$ reaction gas is preferable. The plasma CVD method has an advantage that the chemical reaction, which demands high temperature under normal thermal equilibrium, can be carried out at low temperature. The plasma generation methods include two methods: a capacitively coupled method and an inductively coupled method. Examples of the reaction gases include a $SiH_4$—$N_2O$ gas containing $SiH_4$ as the Si source and $N_2O$ as the oxygen source; and a TEOS-O gas (TEOS-plasma CVD method) containing tetraethoxysilane (TEOS) as the Si source. The substrate temperature is preferably 250° C. to 400° C., and the reaction pressure is preferably in the range of 67 to 400 Pa. Thus, the silicon oxide film for used in the present invention may be doped with an element such as phosphorus or boron. Similarly, the silicon nitride film is formed by use of dichlorosilane ($SiH_2Cl_2$) as the Si source and ammonia ($NH_3$) as the nitrogen source. The silicon oxide film is obtained at a high temperature of 900° C. in the $SiH_2Cl_2$—$NH_3$ oxidation reaction. The reaction gas used in forming a silicon nitride film by the plasma CVD method is a $SiH_4$—$NH_3$ gas containing $SiH_4$ as the Si source and $NH_3$ as the nitrogen source. The support temperature is preferably 300° C. to 400° C.

The CMP polishing slurry and the polishing method according to the present invention can be applied not only to the silicon oxide film formed on a semiconductor substrate but also can be used in the production processes for various semiconductor devices. For example, it can be used in polishing: silicon oxide films formed on a wiring board having a particular wiring; inorganic insulation films such as of glass or silicon nitride; films mainly containing polysilicon, Al, Cu, Ti, TiN, W, Ta, TaN, or the like; optical glasses such as photomask, lens, and prism; inorganic conductive films such as of ITO film; optical integrated circuit, photoswitching element, and optical waveguides such as of glass or a crystalline material; end face of optical fiber; optical single crystals such as scintillator; solid state laser single crystals; blue laser LED sapphire substrates; semiconductor single crystals such as of SiC, GaP, and GaAs; glass plates for magnetic disk; magnetism heads, and the like.

EXAMPLE

Example 1

Preparation of Supplementary Solution 1,000 g of deionized water and 200 g of 2-propanol were placed in a 3-L preparative flask and heated to 90° C. under nitrogen gas atmosphere; a mixture of 561 g of a methacrylic acid and 64 g of deionized water and a solution of 64 g of 2,2'-azobis[2-(2-imidazolin-2-yl)propane]bisulfate dihydrate salt dissolved in 536 g of deionized water were added respectively into the flask over 2 hours. The mixture was then kept at 90° C. for 3 hours and cooled, to give a supplementary solution, a polymethacrylic acid solution containing a polymer (D).

The content of the nonvolatile matter therein was found to be 25 mass %. The weight-average molecular weight of the polymethacrylic acid solution thus obtained, as determined with a HPLC pump (Model No. L-7100, manufactured by Hitachi, Ltd.) equipped with a differential refractometer (Model No. L-3300, manufactured by Hitachi, Ltd.) and a GPC column (Model No. Gelpack GL-W550, manufactured by Hitachi Chemical Co., Ltd.) connected thereto by using a liquid mixture of aqueous 50 mM disodium hydrogen phosphate solution/acetonitrile: 90/10 (V/V) as a mobile phase, was 25,000 (as polyethylene glycol).

(Preparation of Cerium Oxide Slurry)

40 kg of cerium carbonate hydrate was placed in an alumina container and calcined at 830° C. for 2 hours in air, to give 20 kg of a yellow white powder. Analysis of the powder by X-ray diffraction confirmed that the product was cerium oxide. The diameter of the calcined powder particles, as determined by a particle size distribution analyzer, was 30 to 100 μm. Then, 20 kg of the cerium oxide particle powder was dry-pulverized in a jet mill. The specific surface area of the polycrystalline material, as determined by a BET method, was 9 $m^2/g$.

20 kg of the cerium oxide powder thus obtained and 79.750 kg of deionized water were mixed; 250 g of a commercially available aqueous ammonium polyacrylate solution (weight-average molecular weight: 8,000, weight 40%) was added as a dispersant; and the mixture was ultrasonicated while stirred, to give a cerium oxide dispersion. The ultrasonic wave frequency was 400 kHz, and the dispersion period was 20 minutes. Then, 5 kg of the cerium oxide dispersion was placed, left still, and subjected to sedimentation classification in a 10-L container. After classification for 200 hours, the supernatant dispersion at a height of 110 mm or more from the container bottom was withdrawn with a pump. The supernatant cerium oxide dispersion obtained was diluted with deionized water to a solid matter concentration of 5 mass %, to give a cerium oxide slurry.

The slurry was diluted to a suitable concentration for measurement of the average particle diameter of the particles in the cerium oxide slurry, and the average particle diameter D50, as determined by using a laser-diffraction particle size distribution analyzer Master Sizer Microplus (trade name, manufactured by Malvern) at a refractive index of 1.93 and an absorption of 0, was 170 nm. The amount of impurity ions (Na, K, Fe, Al, Zr, Cu, Si, and Ti) in the slurry, as determined by an atomic absorption photometer (Model No. AA-670G, manufactured by Shimadzu Corporation), was 1 ppm or less by mass.

(Preparation of CMP Polishing Slurry)

36 g of the supplementary solution, polymethacrylic acid solution (25 mass %), thus obtained and 2,364 g of deionized water were mixed, and the mixture was adjusted to pH 4.7 with ammonia water (25 mass %). 600 g of the cerium oxide slurry (solid matter: 5 mass %) was added additionally, to give a cerium oxide-based CMP polishing slurry (solid matter: 1.0 mass %). The polishing slurry pH was 5.0.

The average particle diameter of the particles in the polishing slurry, as determined in a laser diffraction particle size distribution analyzer after it was diluted to a suitable concentration, was 170 nm. Then, the polishing slurry was centrifuged, to give a supernatant liquid. The concentration of sulfate, hydrochloride and nitrate ions in the polishing slurry was determined with the supernatant liquid in a capillary electrophoresis analyzer (Model No. CAPI-3300, manufactured by Otsuka Electronics Co., Ltd.). The electrophoretic voltage was −30 kV; the buffer and the sample were injected by the hydrodynamic injection method (height: 25 mm), and the injection period was 90 seconds. A calibration curve prepared by three strong acid ion samples at concentrations 300, 600, and 1,000 ppm was used for calculation of the concentration. As a result, detected was a sulfate ion at a concentration of 130 ppm by mass.

(Polishing of Insulation Film Layer)

An International SEMATECH wafer (864 wafer (φ200 mm, SiN film thickness: 150 nm, $SiO_2$ film thickness in convex region: 610 nm, in concave region: 610 nm, trench depth: 320 nm, manufactured by International SEMATECH) was used as a test wafer for evaluation of shallow-trench-device-isolation insulation film CMP. The test wafer was placed on a holder carrying an adsorption pad for fixing the substrate of the polishing machine (trade name: EPO-111, manufactured by Ebara Corporation), while a porous urethane resin polishing pad (perforated groove, Model No. IC-1000, prepared by Rodel) was connected to a φ600 mm polishing table. The holder was placed on the pad with the wafer's insulation film face downward, and the processing load and the backside pressure were respectively set to 30 and 15 kPa. The CMP polishing slurry prepared above was applied on the polishing table dropwise at a speed of 200 mL/minute, and the polishing table and the wafer were rotated respectively at frequencies of 50 and 50 rpm, to polish the test sample for evaluation of STI insulation film CMP. The polishing end point was determined by monitoring the torque current of the polishing table. The wafer after polishing was washed thoroughly with purified water and then dried. Then, the thickness of the residual convex SiN film and the residual concave $SiO_2$ film in high density region (convex pattern density: 70%) and in low density region (convex pattern density: 10%) was determined by using an optical interference thickness meter (trade name: Nanospec AFT-5100, manufactured by Nanometrics Inc.). The measurement results are summarized in Table 1. A convex pattern density 10% means a pattern in which a convex region and a concave region are aligned alternately in the ratio in width of 10 and 90, and a convex pattern density 70% means a pattern in which a convex region and a concave region are aligned alternately in the ratio in width of 70 and 30.

Example 2

Preparation of Supplementary Solution 600 g of deionized water and 600 g of 2-propanol were placed in a 3-L preparative flask and heated to 85° C. under nitrogen gas atmosphere; a mixture of 536 g of a methacrylic acid and 45 g of an acrylic acid and a solution of 32 g of ammonium persulfate dissolved in 600 g of deionized were added respectively into the flask over 2 hours. The mixture was then kept at 85° C. for 3 hours and cooled, to give a supplementary solution, a polyacrylic acid-90 mol % methacrylic acid copolymer solution (methacrylic acid:acrylic acid=9:1). The content of the nonvolatile matter therein was found to be 25 mass %. The weight-average molecular weight of the polyacrylic acid-90 mol % methacrylic acid copolymer thus obtained, as determined in the same manner as in Example 1, was 23,000 (as polyethylene glycol).

(Preparation of Polishing Slurry)

36 g of the supplementary solution thus obtained, polyacrylic acid-90 mol % methacrylic acid copolymer solution (25 mass %), and 2,364 g of deionized water were mixed, and the mixture was adjusted to pH 4.6 with ammonia water (25 mass %). 600 g of the cerium oxide slurry (solid matter: 5 mass %) was added additionally, to give a cerium oxide-based CMP polishing slurry (solid matter: 1.0 mass %). The polishing slurry pH was 5.0. The average particle diameter of the particles in the polishing slurry, as determined in a laser diffraction particle size distribution analyzer after it was diluted to a suitable concentration, was 170 nm. Subsequent analysis of the strong acid ion concentration in the same manner as in Example 1 showed a sulfate ion concentration of 100 ppm.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 1.

Example 3

Preparation of Supplementary Solution 1,000 g of deionized water and 200 g of 2-propanol were placed in a 3-L preparative flask and heated to 90° C. under nitrogen gas atmosphere; a mixture of 401 g of a methacrylic acid and 134 g of an acrylic acid and a solution of 59 g of 2,2'-azobis[2-(2-imidazolin-2-yl)propane] dissolved in 589 g of aqueous 5 mass % sulfuric acid were added respectively into the flask over 2 hours. The mixture was then kept at 90° C. for 3 hours and cooled, to give a supplementary solution, polyacrylic acid-70 mol % methacrylic acid copolymer solution. The content of the nonvolatile matter therein was found to be 25 mass %. The weight-average molecular weight of the polyacrylic acid-70 mol % methacrylic acid copolymer thus obtained, as determined in the same manner as in Example 1, was 22,000 (as polyethylene glycol).

(Preparation of Polishing Slurry)

36 g of the supplementary solution thus obtained, polyacrylic acid-70 mol % methacrylic acid copolymer solution (25 mass %), and 2,364 g of deionized water were mixed, and the mixture was adjusted to pH 4.6 with ammonia water (25 mass %). 600 g of the cerium oxide slurry (solid matter: 5 mass %) was added additionally, to give a cerium oxide-based CMP polishing slurry (solid matter: 1.0 mass %). The polishing slurry pH was 5.0. The average particle diameter of the particles in the polishing slurry, as determined in a laser diffraction particle size distribution analyzer after it was diluted to a suitable concentration, was 170 nm. Then, the strong acid ion concentration as determined in the same manner as in Example 1 showed a sulfate ion concentration of 150 ppm by mass.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 1.

Example 4

Preparation of Supplementary Solution 1,000 g of deionized water and 200 g of 2-propanol were placed in a 3-L preparative flask, and a mixture of 279 g of methacrylic acid, 232 g of acrylic acid and 89 g of deionized water and a solution of 89 g of diammonium sulfite monohydrate dissolved in 511 g of deionized water were added respectively into the flask over 2 hours at 25° C. while the deionized water in the flask was agitated with air supplied at a flow rate of approximately 3 L/minute. The mixture was then kept at 25° C. for 3 hours and cooled, to give a supplementary solution, a polyacrylic acid-50 mol % methacrylic acid copolymer solution. The content of the nonvolatile matter therein was found to be 25 mass %. The weight-average molecular weight of the polyacrylic acid-50 mol % methacrylic acid copolymer thus obtained, as determined in the same manner as in Example 1, was 29,000 (as polyethylene glycol).

(Preparation of Polishing Slurry)

36 g of the supplementary solution thus obtained, polyacrylic acid-50 mol % methacrylic acid copolymer solution (25 mass %), and 2,364 g of deionized water were mixed, and the mixture was adjusted to pH 4.6 with ammonia water (25 mass %). 600 g of the cerium oxide slurry (solid matter: 5 mass %) was added additionally, to give a cerium oxide-based CMP polishing slurry (solid matter: 1.0 mass %). The polishing slurry pH was 5.0. The average particle diameter of the particles in the polishing slurry, as determined in a laser diffraction particle size distribution analyzer after it was diluted to a suitable concentration, was 170 nm. Subsequent analysis of the strong acid ion concentration in the same manner as in Example 1 showed a sulfate ion concentration of 230 ppm by mass.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 1.

Example 5

Preparation of Supplementary Solution 1,000 g of deionized water and 200 g of 2-propanol were placed in a 3-L preparative flask, and a mixture of 180.4 g of a methacrylic acid, 352.3 g of an acrylic acid and 69.3 g of deionized water and a solution of 69.4 g of 2,2'-azobis[2-(2-imidazolin-2-yl)propane]bisulfate dihydrate salt dissolved in 532.6 g of deionized water were added respectively into the flask over 2 hours at 25° C. while the deionized water in the flask was agitated with air supplied at a flow rate of approximately 3 L/minute. The mixture was then kept at 25° C. for 3 hours and cooled, to give a supplementary solution, a polyacrylic acid-30 mol % methacrylic acid copolymer solution. The content of the nonvolatile matter therein was found to be 25 mass %. The weight-average molecular weight of the polyacrylic acid-30 mol % methacrylic acid copolymer thus obtained, as determined in the same manner as in Example 1, was 25,000 (as polyethylene glycol).

(Preparation of Polishing Slurry)

36 g of the supplementary solution thus obtained, polyacrylic acid-30 mol % methacrylic acid copolymer solution (25 mass %), and 2,364 g of deionized water were mixed, and the mixture was adjusted to pH 4.6 with ammonia water (25 mass %). 600 g of the cerium oxide slurry (solid matter: 5 mass %) was added additionally, to give a cerium oxide-based CMP polishing slurry (solid matter: 1.0 mass %). The polishing slurry pH was 5.0. The average particle diameter of the particles in the polishing slurry, as determined in a laser diffraction particle size distribution analyzer after it was diluted to a suitable concentration, was 170 nm. Subsequent analysis of the strong acid ion concentration in the same manner as in Example 1 showed a sulfate ion concentration of 272 ppm by mass.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 1.

Example 6

Preparation of Supplementary Solution 1,000 g of deionized water and 200 g of 2-propanol were placed in a 3-L preparative flask, and a mixture of 62.2 g of methacrylic acid, 468.2 g of acrylic acid and 69.6 g of deionized water and a solution of 69.7 g of 2,2'-azobis[2-(2-imidazolin-2-yl)propane]bisulfate dihydrate salt dissolved in 530.3 g of deionized water were added respectively into the flask over 2 hours at 25° C. while the deionized water in the flask was agitated with air supplied at a flow rate of approximately 3 L/minute. The mixture was then kept at 25° C. for 3 hours and cooled, to give a supplementary solution, a polyacrylic acid-10 mol % methacrylic acid copolymer solution. The content of the nonvolatile matter therein was found to be 25 mass %. The weight-average molecular weight of the polyacrylic acid-10 mol % methacrylic acid copolymer thus obtained, as determined in the same manner as in Example 1, was 46,000 (as polyethylene glycol).

(Preparation of Polishing Slurry)

36 g of the supplementary solution thus obtained, polyacrylic acid-10 mol % methacrylic acid copolymer solution (25 mass %), and 2,364 g of deionized water were mixed, and the mixture was adjusted to pH 4.6 with ammonia water (25 mass %). 600 g of the cerium oxide slurry (solid matter: 5 mass %) was added additionally, to give a cerium oxide-based CMP polishing slurry (solid matter: 1.0 mass %). The polishing slurry pH was 5.0. The average particle diameter of the particles in the polishing slurry, as determined in a laser diffraction particle size distribution analyzer after it was diluted to a suitable concentration, was 170 nm. Subsequent analysis of the strong acid ion concentration in the same manner as in Example 1 showed a sulfate ion concentration of 275 ppm by mass.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 1.

convex-region residual SiN film thickness in the low-density area (convex region: 10%) was 118 to 140 nm, while the concave-region $SiO_2$ film thickness was 340 to 390 nm. The difference in convex-region residual SiN film thickness between in the high-density area (convex region: 70%) and in the low-density area (convex region: 10%) was 10 to 35 nm, while the difference in concave-region residual $SiO_2$ film thickness between them was 96 to 142 nm, indicating that uniform polishing with little influence by the difference in pattern density was performed. In addition, observation of the insulation film surface after polishing under an optical microscope showed no distinct polishing scratch in any Examples.

In particular, when a wafer for evaluation was polished with each of the CMP polishing slurries prepared in Examples 1 to 4, the convex $SiO_2$ film in the high-density area (convex region: 70%) was removed in 185 to 210 seconds, indicating that the polishing speed was favorable. The convex-region residual SiN film thickness in the low-density area (convex region: 10%) was 127 to 140 nm, and the concave-

TABLE 1

| | Items | \multicolumn{6}{c|}{Examples} |
|---|---|---|---|---|---|---|---|
| | | 1 | 2 | 3 | 4 | 5 | 6 |
| | Cerium oxide blending amount (mass %) | 1.0 | 1.0 | 1.0 | 1.0 | 1.0 | 1.0 |
| Polymer | Methacrylic acid:Acrylic acid | 100:0 (mol %) | 90:10 (mol %) | 70:30 (mol %) | 50:50 (mol %) | 30:70 (mol %) | 10:90 (mol %) |
| | Polymerization initiator | polymer (1)* | copolymer Ammonium per sulfate | copolymer (2)* | copolymer Diammonium sulfite hydrate | copolymer (1)* | copolymer ((1)* |
| | Weight-average molecular weight | 25,000 | 23,000 | 22,000 | 29,000 | 25,000 | 46,000 |
| | Addition amount (mass %) | 0.3 | 0.3 | 0.3 | 0.3 | 0.3 | 0.3 |
| | Polishing period until SiN film exposure in 70% convex region (sec) | 185 | 210 | 200 | 210 | 240 | 260 |
| Residual SiN film thickness in convex region (nm) | Convex region 70% | 150 | 150 | 145 | 150 | 148 | 153 |
| | Convex region 10% | 140 | 136 | 133 | 127 | 122 | 118 |
| | Difference in residual film thickness | 10 | 14 | 12 | 23 | 26 | 35 |
| Residual $SiO_2$ film thickness in concave region (nm) | Convex region 70% | 486 | 490 | 490 | 490 | 480 | 482 |
| | Convex region 10% | 390 | 354 | 361 | 360 | 347 | 340 |
| | Difference in residual film thickness | 96 | 136 | 129 | 130 | 133 | 142 |

(1)*: 2,2'-Azobis[2-(2-imidazolin-2-yl)propane] bisulfate dihydrate salt
(2)*: 2,2'-Azobis[2-(2-imidazolin-2-yl)propane]

As described above, a wafer for evaluation was polished with each of the CMP polishing slurries prepared in Examples 1 to 6, and the convex $SiO_2$ film in the high-density area (convex region: 70%) was removed and the SiN film was exposed in 185 to 260 seconds, as shown in Table 1. The region residual $SiO_2$ film thickness was 354 to 390 nm; and the difference in convex-region residual SiN film thickness between in the high-density area (convex region: 70%) and in the low-density area (convex region: 10%) was 10 to 23 nm, and the difference in concave-region residual $SiO_2$ film thickness was 96 to 136 nm, indicating that uniform polishing with less influence by the difference in pattern density was performed.

Comparative Example 1

Preparation of Supplementary Solution 480 g of isopropanol and 480 g of deionized water were placed in a 3-L preparative flask and heated to 75° C. while stirred under nitrogen gas atmosphere, and a solution of 560 g of an acrylic acid and 40 g of 2,2'-azobisisobutylonitrile dissolved in 500 g of isopropanol was added thereto over a period of 2 hours. The mixture was then kept at 75° C. for 3 hours and cooled to give a supplementary solution, an aqueous polyacrylic acid solution. The content of the nonvolatile matter therein was found to be 25 mass %. The weight-average molecular weight of the polyacrylic acid obtained, as determined in the same manner as in Example 1, was 10,000 (as polyethylene glycol).

(Preparation of Polishing Slurry)

48 g of the supplementary solution thus prepared, aqueous polyacrylic acid solution (25 mass %), and 2,352 g of deionized water were mixed, and the mixture was adjusted to pH 6.9 with ammonia water (25 mass %). 600 g of the cerium oxide slurry (solid matter: 5 mass %) was added additionally, to give a cerium oxide polishing slurry (solid matter: 1.0 mass %). The polishing slurry pH was 7.0. The average of the particle diameter of the particles in the polishing slurry, as determined in a laser diffraction particle size distribution analyzer after it was diluted to a suitable concentration, was 170 nm. The strong acid ion concentration, as determined in the same manner as in Example 1, was 10 ppm or less by mass.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 2.

Comparative Example 2

Preparation of Polishing Slurry 12 g of a commercially available polyitaconic acid powder and 2,388 g of deionized water were mixed, and the mixture was adjusted to pH 4.3 with ammonia water (25 mass %). The weight-average molecular weight of the polyitaconic acid, as determined in the same manner as in Example 1, was 14,000 (as polyethylene glycol). 600 g of the cerium oxide slurry (solid matter: 5 mass %) was added additionally, to give a cerium oxide polishing slurry (solid matter: 1.0 mass %). The polishing slurry pH was 5.0. The average of the particle diameter of the particles in the polishing slurry, as determined in a laser diffraction particle size distribution analyzer after it was diluted to a suitable concentration, was 170 nm. Subsequent analysis of the strong acid ion concentration in the same manner as in Example 1 showed a sulfate ion concentration of 10 ppm or less by mass.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 2.

Comparative Example 3

Preparation of Polishing Slurry 24 g of an aqueous polyacrylic acid-50 mol % maleic acid copolymer solution (50 mass %) provided by Aldrich and 2,376 g of deionized water were mixed, and the mixture was adjusted to pH 4.3 with ammonia water (25 mass %). The weight-average molecular weight of the polyacrylic acid-50 mol % maleic acid copolymer, as determined in the same manner as in Example 1, was 8,000 (as polyethylene glycol). 600 g of the cerium oxide slurry (solid matter: 5 mass %) was added additionally, to give a cerium oxide-based CMP polishing slurry (solid matter: 1.0 mass %). The polishing slurry pH was 5.0. The average of the particle diameter of the particles in the polishing slurry, as determined in a laser diffraction particle size distribution analyzer after it was diluted to a suitable concentration, was 170 nm. Subsequent analysis of the strong acid ion concentration in the same manner as in Example 1 showed a sulfate ion concentration of 10 ppm or less by mass.

(Polishing of Insulation Film Layer)

A test wafer for evaluation of shallow-trench-device-isolation insulation film CMP was polished in the same manner as in Example 1 except that the polishing slurry thus obtained was used, to give the results shown in Table 2.

TABLE 2

| Items | | Comparative Examples | | |
|---|---|---|---|---|
| | | 1 | 2 | 3 |
| Cerium oxide blending amount (mass %) | | 1.0 | 1.0 | 1.0 |
| Polymer | Kind | Polyacrylic acid | Polyitaconic acid | Polyacrylic acid–50 mol % polymaleic acid copolymer |
| | Polymerization initiator | 2,2'-Azobis-isobutylo-nitrile | None | None |
| | Weight-average molecular weight | 10,000 | 14,000 | 8,000 |
| | Addition amount (mass %) | 0.4 | 0.4 | 0.4 |
| Polishing period until SiN film exposure in 70% convex-region (sec) | | 240 | 210 | 265 |
| Residual SiN film thickness in convex region (nm) | Convex region 70% | 145 | 143 | 155 |
| | Convex region 10% | 88 | 82 | 91 |
| | Difference in residual film thickness | 57 | 61 | 64 |
| Residual $SiO_2$ film thickness in concave region (nm) | Convex region 70% | 507 | 487 | 499 |
| | Convex region 10% | 342 | 305 | 313 |
| | Difference in residual film thickness | 165 | 182 | 186 |

As described above, a wafer for evaluation was polished with each of the CMP polishing slurries prepared in Comparative Examples 1 to 3, and the convex SiN film in the high-density area (convex region: 70%) was exposed in 210 to 265 seconds, as shown in Table 2. The convex-region SiN residual film thickness in the low-density area (convex region: 10%) was 82 to 91 nm, while the concave-region $SiO_2$ residual film thickness was 305 to 342 nm; and the difference in convex-region residual SiN film thickness between in the high-density area (convex region: 70%) and in the low-density area (convex region: 10%) was 57 to 64 nm, while the difference in concave-region residual SiO$_2$ film thickness between them was 165 to 186 nm, indicating that influence by the difference in pattern density occurred and irregular polishing was performed.

The experimental results above show that the wafer was polished uniformly with little influence by the difference in pattern density in Examples 1 to 6. In particular, in Examples 1 to 4, the wafer was polished enough uniformly at a favorable polishing speed with less influence due to the pattern density difference.

INDUSTRIAL APPLICABILITY

The present invention provides a polishing slurry for use in CMP methods of smoothening the surface of an interlayer dielecrtric film, a BPSG film, a shallow-trench-isolation insulation film, and the like, that is resistant to the fluctuation in film thickness due to difference in pattern density, allows polishing of a silicon oxide film and others in high-speed processing and easier process management, and a polishing method by using the polishing slurry.

The invention claimed is:

1. A method of producing a CMP polishing slurry, comprising preparing ingredient (A) cerium oxide particles, ingredient (B) a dispersant, ingredient (C) water,
   obtaining a solution containing ingredient (D) selected from the group consisting of at least one of a polymer of at least one of a methacrylic acid and the salt thereof, a polymer of at least one of a methacrylic acid and the salt thereof and a monomer having an unsaturated double bond, and mixtures thereof, synthesized with use of a polymerization initiator, and
   mixing the ingredients (A), (B), (C) and (D) to prepare the CMP polishing slurry,
   wherein the polymerization initiator is a compound soluble completely at 25° C. when it is added at a ratio of 0.5 mass part in 99.5 mass parts of water or a compound soluble at 25° C. when it is added at a ratio of 0.5 mass part in 99.5 mass parts of water and at least one of an organic acid and an inorganic acid is added thereto in an amount of 2 moles with respect to 1 mole of the polymerization initiator,
   wherein the content of the methacrylic acid and the salt thereof for the polymer (D) is 10 to 100 tool % with respect to the total amount of the monomer components,
   the amount of dispersant added is 0.01 mass parts or more and 10 mass parts or less with respect to 100 mass parts of the cerium oxide particles,
   the amount of cerium oxide particles added is 0.1 to 5 mass parts with respect to 100 mass parts of the CMP polishing slurry, the polymer (D) has a weight-average molecular weight of 200 to 100,000,
   the amount of the polymer (D) is 0.01 to 5 mass parts with respect to 100 mass parts of the CMP polishing slurry, and
(IV):
   (I) at least one peroxide selected from the group consisting of ammonium persulfate, potassium persulfate, and sodium persulfate,
   (II) at least one redox initiator initiators in combination of a sulfite salt, and selected from the combinations of (i) at least one selected from the group consisting of ammonium sulfite, ammonium hydrogen sulfite, potassium sulfite, potassium hydrogen sulfite, sodium sulfite, and sodium hydrogen sulfite and (ii) at least one selected from the group consisting of oxygen, air, and peroxide,
   (III) 2,2'-azobis[N-(2-carboxyethyl)-2-methyl propionamide]amphoteric azo compound and
   (IV) at least one cationic azo compound selected from the group consisting of 1-[(1-cyano-1-methylethyl)azo]formamide, 2,2'-azobis {2-methyl-N-[1,1-bis(hydroxymethyl)-2-hydroxyethyl]propionamide}, 2,2'-azobis{2-methyl-N-[2-(1-hydroxybutyl)]-propionamide}, 2,2'-azobis[2-methyl-N-(1-hydroxyethyl)]-propionamide, 2,2'-azobis[2-(5-methyl-2-imidazolin-2-yl)propane] hydrochloride salt, 2,2'-azobis[2-(2-imidazolin-2-yl) propane], 2,2'-azobis[2-(2-imidazolin-2-yl)propane] hydrochloride salt, 2,2'-azobis[2-(2-imidazolin-2-yl) propane]sulfate hydrate salt, 2,2'-azobis[2-(3,4,5,6-tetrahydropyrimidin-2-yl)propane]hydrochloride salt, 2,2'-azobis {2-[1-(2-hydroxyethyl)-2-imidazolin-2-yl] propane}hydrochloride salt, 2,2'-azobis[N-(2-carboxyethyl)-2-methylpropionamidine], and 2,2'-azobis(2-methyl propionamidoxime).

2. A method of producing a CMP polishing slurry, comprising preparing ingredient (A) cerium oxide particles, ingredient (C) water,
   obtaining a solution containing ingredient (D) selected from the group consisting of at least one of a polymer of at least one of a methacrylic acid and the salt thereof, a polymer of at least one of a methacrylic acid and the salt thereof and a monomer having an unsaturated double bond, and mixtures thereof, synthesized with use of a polymerization initiator,
   synthesizing ingredient (E) at least one of a polymer of at least one of an acrylic acid and the salt thereof, and a polymer of at least one of an acrylic acid and the salt thereof and a monomer having an unsaturated double bond and
   mixing the ingredients (A), (C), (D) and (E), to prepare the CMP polishing slurry,
   wherein the polymerization initiator is a compound soluble completely at 25° C. when it is added at a ratio of 0.5 mass part in 99.5 mass parts of water or a compound soluble at 25° C. when it is added at a ratio of 0.5 mass part in 99.5 mass parts of water and at least one of an organic acid and inorganic acid is added thereto in an amount of 2 moles with respect to 1 mole of the polymerization initiator,
   the content of the methacrylic acid and the salt thereof for the polymer (D) is 10 to 100 mol % with respect to the total amount of the monomer components,
   the polymer (D) has a weight-average molecular weight of 200 to 100,000,
   the amount of the polymer (D) is 0.01 to 5 mass parts with respect to 100 mass parts of the CMP polishing slurry, and
   the polymerization initiator is at least one selected from the group consisting of (I) to (IV):
   (I) at least one peroxide selected from the group consisting of ammonium persulfate, potassium persulfate, and sodium persulfate,
   (II) at least one redox initiator initiators in combination of a sulfite salt, and selected from the combinations of (i) at least one selected from the group consisting of ammonium sulfite, ammonium hydrogen sulfite, potassium sulfite, potassium hydrogen sulfite, sodium sulfite, and sodium hydrogen sulfite and (ii) at least one selected from the group consisting of oxygen, air, and peroxide,
   (III) 2,2'-azobis[N-(2-carboxyethyl)-2-methyl propionamide]amphoteric azo compound and (IV) at least one cationic azo compound selected from the group consisting of 1-[(1-cyano-1-methylethyl)azo]formamide, 2,2'-azobis {2-methyl-N-[1,1-bis(hydroxymethyl)-2-hydroxyethyl]propionamide}, 2,2'-azobis{2-methyl-N-[2-(1-hydroxybutyl)]-propionamide}, 2,2'-azobis[2-methyl-N-(1-hydroxyethyl)]-propionamide, 2,2'-azobis[2-(5-methyl-2-imidazolin-2-yl)propane] hydrochloride salt, 2,2'-azobis[2-(2-imidazolin-2-yl)propane], 2,2'-azobis[2-(2-imidazolin-2-yl)propane] hydrochloride salt, 2,2'-azobis[2-(2-imidazolin-2-yl)propane]sulfate hydrate salt, 2,2'-azobis[2-(3,4,5,6-tetrahydropyrimidin-2-yl)propane]hydrochloride salt, 2,2'-azobis {2-[1-(2-hydroxyethyl)-2-imidazolin-2-yl]propane}hydrochloride salt, 2,2'-azobis[N-(2-carboxyethyl)-2-methylpropionamidine], and 2,2'-azobis(2-methyl propionamidoxime).

3. The method of producing a CMP polishing slurry according to any one of claims 1 and 2, wherein the polymerization initiator for use in preparation of the polymer (D) is a compound soluble completely at 25° C. when it is added at a ratio of 3.0 mass parts in 97.0 mass parts of water or a compound soluble at 25° C. when it is added at a ratio of 3.0 mass parts in 97.0 mass parts of water and at least one of an organic acid and an inorganic acid is added thereto in an amount of 2 moles with respect to 1 mole of the polymerization initiator.

4. The method of producing a CMP polishing slurry according to any one of claims 1 and 2, wherein the average particle diameter of the ingredient (A): cerium oxide particles is 1 to 400 nm.

5. The method of producing a CMP polishing slurry according to any one of claims 1 and 2, wherein further comprising
adjusting the pH of the polishing slurry to 4.5 to 6.0.

6. The method of producing a CMP polishing slurry according to any one of claims 1 and 2, wherein the CMP polishing slurry further contains a strong acid ion, and the method comprises adjusting the content of the strong acid ion to 50 to 10,000 ppm by mass with respect to the CMP polishing slurry.

7. A method of polishing a substrate, comprising
preparing a CMP polishing slurry by
preparing ingredient (A) cerium oxide particles, ingredient (B) a dispersant, ingredient (C) water,
obtaining a solution containing ingredient (D) selected from the group consisting of at least one of a polymer of at least one of a methacrylic acid and the salt thereof, a polymer of at least one of a methacrylic acid and the salt thereof and a monomer having an unsaturated double bond, and mixtures thereof, synthesized with use of a polymerization initiator, and
mixing the ingredients (A), (B), (C) and (D) to prepare the CMP polishing slurry,
wherein the polymerization initiator is a compound soluble completely at 25° C. when it is added at a ratio of 0.5 mass part in 99.5 mass parts of water or a compound soluble at 25° C. when it is added at a ratio of 0.5 mass part in 99.5 mass parts of water and at least one of an organic acid and an inorganic acid is added thereto in an amount of 2 moles with respect to 1 mole of the polymerization initiator,
pressing a substrate having a formed film to be polished onto a polishing cloth of a polishing table, and
polishing the film to be polished by moving the substrate and the polishing table relatively to each other while supplying the CMP polishing slurry into the space between the film to be polished and the polishing cloth,
wherein the content of the methacrylic acid and the salt thereof for the polymer (D) is 10 to 100 mol % with respect to the total amount of the monomer components,
the amount of dispersant added is 0.01 mass parts or more and 10 mass parts or less with respect to 100 mass parts of the cerium oxide particles,
the amount of cerium oxide particles added is 0.1 to 5 mass parts with respect to 100 mass parts of the CMP polishing slurry,
the polymer (D) has a weight-average molecular weight of 200 to 100,000,
the amount of the polymer (D) is 0.01 to 5 mass parts with respect to 100 mass parts of the CMP polishing slurry, and
the polymerization initiator is at least one selected from the group consisting of (I) to (IV):
(I) at least one peroxide selected from the group consisting of ammonium persulfate, potassium persulfate, and sodium persulfate,
(II) at least one redox initiator initiators in combination of a sulfite salt, and selected from the combinations of (i) at least one selected from the group consisting of ammonium sulfite, ammonium hydrogen sulfite, potassium sulfite, potassium hydrogen sulfite, sodium sulfite, and sodium hydrogen sulfite and (ii) at least one selected from the group consisting of oxygen, air, and peroxide,
(III) 2,2'-azobis[N-(2-carboxyethyl)-2-methyl propionamide]amphoteric azo compound and
(IV) at least one cationic azo compound selected from the group consisting of 1-[(1-cyano-1-methylethyl)azo]formamide, 2,2'-azobis {2-methyl-N-[1,1-bis(hydroxymethyl)-2-hydroxyethyl]propionamide}, 2,2'-azobis{2-methyl-N-[2-(1-hydroxybutyl)]-propionamide}, 2,2'-azobis[2-methyl-N-(1-hydroxyethyl)]-propionamide, 2,2'-azobis[2-(5-methyl-2-imidazolin-2-yl)propane] hydrochloride salt, 2,2'-azobis[2-(2-imidazolin-2-yl)propane], 2,2'-azobis[2-(2-imidazolin-2-yl)propane] hydrochloride salt, 2,2'-azobis[2-(2-imidazolin-2-yl)propane]sulfate hydrate salt, 2,2'-azobis[2-(3,4,5,6-tetrahydropyrimidin-2-yl)propane]hydrochloride salt, 2,2'-azobis {2-[1-(2-hydroxyethyl)-2-imidazolin-2-yl]propane}hydrochloride salt, 2,2'-azobis[N-(2-carboxyethyl)-2-methylpropionamidine], and 2,2'-azobis(2-methyl propionamidoxime).

8. A method of polishing a substrate, comprising
preparing a CMP polishing slurry by preparing ingredient (A) cerium oxide particles, ingredient (C) water,
obtaining a solution containing ingredient (D) selected from the group consisting of at least one of a polymer of at least one of a methacrylic acid and the salt thereof, a polymer of at least one of a methacrylic acid and the salt thereof and a monomer having an unsaturated double bond, and mixtures thereof, synthesized with use of a polymerization initiator,
synthesizing ingredient (E) at least one of a polymer of at least one of an acrylic acid and the salt thereof, and a polymer of at least one of an acrylic acid and the salt thereof and a monomer having an unsaturated double bond with and
mixing the ingredients (A), (C), (D) and (E), to prepare the CMP polishing slurry,
wherein the polymerization initiator is a compound soluble completely at 25° C. when it is added at a ratio of 0.5 mass part in 99.5 mass parts of water or a compound soluble at 25° C. when it is added at a ratio of 0.5 mass part in 99.5 mass parts of water and at least one of an organic acid and inorganic acid is added thereto in an amount of 2 moles with respect to 1 mole of the polymerization initiator, pressing a substrate having a formed film to be polished onto a polishing cloth of a polishing table, and polishing the film to be polished by moving the substrate and the polishing table relatively to each other while supplying the CMP polishing slurry into the space between the film to be polished and the polishing cloth, wherein the content of the methacrylic acid and the salt thereof for the polymer (D) is 10 to 100 mol % with respect to the total amount of the monomer components the polymer (D) has a weight-average molecular weight of 200 to 100,000, the amount of the polymer (D) is 0.01 to 5 mass parts with respect to 100 mass parts of the CMP polishing slurry, and the polymerization initiator is at least one selected from the group consisting of (I) to (IV):

(I) at least one peroxide selected from the group consisting of ammonium persulfate, potassium persulfate, and sodium persulfate, (II) at least one redox initiator initiators in combination of a sulfite salt, and selected from the combinations of (i) at least one selected from the group consisting of ammonium sulfite, ammonium hydrogen sulfite, potassium sulfite, potassium hydrogen sulfite, sodium sulfite, and sodium hydrogen sulfite and (ii) at least one selected from the group consisting of oxygen, air, and peroxide, (III) 2,2'-azobis[N-(2-carboxyethyl)-2-methyl propionamide]amphoteric azo compound and (IV) at least one cationic azo compound selected from the group consisting of 1-[(1-cyano-1-methylethyl)azo]formamide, 2,2'-azobis {2-methyl-N-[1,1-bis(hydroxymethyl)-2-hydroxyethyl]propionamide}, 2,2'-azobis{2-methyl-N-[2-(1-hydroxybutyl)]-propionamide}, 2,2'-azobis[2-methyl-N-(1-hydroxyethyl)]-propionamide, 2,2'-azobis[2-(5-methyl-2-imidazolin-2-yl)propane] hydrochloride salt, 2,2'-azobis[2-(2-imidazolin-2-yl) propane], 2,2'-azobis[2-(2-imidazolin-2-yl)propane] hydrochloride salt, 2,2'-azobis[2-(2-imidazolin-2-yl) propane]sulfate hydrate salt, 2,2'-azobis[2-(3,4,5,6-tetrahydropyrimidin-2-yl)propane]hydrochloride salt, 2,2'-azobis {2-[1-(2-hydroxyethyl)-2-imidazolin-2-yl] propane}hydrochloride salt, 2,2'-azobis[N-(2-carboxyethyl)-2-methylpropionamidine], and 2,2'-azobis(2-methyl propionamidoxime).

* * * * *